United States Patent
Yang

(10) Patent No.: US 11,514,711 B2
(45) Date of Patent: Nov. 29, 2022

(54) FINGERPRINT IDENTIFICATION METHOD AND APPARATUS

(71) Applicant: Beijing Xiaomi Mobile Software Co., Ltd., Beijing (CN)

(72) Inventor: Kun Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 521 days.

(21) Appl. No.: 15/873,495

(22) Filed: Jan. 17, 2018

(65) Prior Publication Data

US 2018/0204043 A1 Jul. 19, 2018

(30) Foreign Application Priority Data

Jan. 17, 2017 (CN) .......................... 201710032068.1

(51) Int. Cl.
*G06K 9/00* (2006.01)
*G06V 40/12* (2022.01)
*G06V 40/13* (2022.01)

(52) U.S. Cl.
CPC ...... *G06V 40/1365* (2022.01); *G06V 40/1306* (2022.01)

(58) Field of Classification Search
CPC ............. G06K 9/0002; G06K 9/00013; G06K 9/00912; G06K 9/00006; G06K 9/00067; G06K 9/0004; G06K 9/00107; G06K 9/00087; G06K 9/0012; G06F 3/044; G06F 3/041; G06F 1/1643; G06F 21/32; G06F 2203/0338; G06F 3/03547; G06F 2203/04106; G06F 2203/04103;
(Continued)

(56) References Cited

U.S. PATENT DOCUMENTS 8,823,399 B1 * 9/2014 Bharathan ........... G06F 3/04166
324/684
9,189,597 B2 11/2015 Bluemler
(Continued)

FOREIGN PATENT DOCUMENTS

CN 104571747 A 4/2015
CN 104765475 A 7/2015
(Continued)

OTHER PUBLICATIONS

Hao Lu, et al., "Gesture On: Enabling Always-On Touch Gestures for Fast Mobile Access from the Device Standby Mode", Google Inc., Gesture Elicitation & Recognition, CHI 2015, Crossings, Seoul, Korea, (10p). (Year: 2015).*
(Continued)

*Primary Examiner* — Michael J Vanchy, Jr.
(74) *Attorney, Agent, or Firm* — Arch & Lake

(57) ABSTRACT

A method and apparatus are provided for fingerprint identification in the field of terminal technology. The method may include: when a touch operation for fingerprint identification is detected on a display screen, determining an acting area and a touch position of the touch operation on the display screen; and determining a fingerprint image corresponding to the touch operation and performing the fingerprint identification, when the acting area is greater than or equal to a first preset area threshold and the touch position is located in a preset identification region on the display screen.

17 Claims, 6 Drawing Sheets

---

When a touch operation for fingerprint identification is detected on a display screen, determine an acting area and a touch position of the touch operation on the display screen — 101

Determine a fingerprint image corresponding to the touch operation and perform the fingerprint identification, when the acting area is greater than or equal to a first preset area threshold and the touch position is located in a preset identification region on the display screen — 102

(58) Field of Classification Search
CPC ....... G06F 2203/04104; G06F 3/04166; G06F 3/0446; G06F 3/04186; G06F 3/0488; G06F 3/04883; G06F 1/00; G06F 2203/04108; G06F 3/00; G06F 3/0443; G06F 3/0448; G06F 3/0484; A61M 2205/505; G01R 1/00; G01R 7/2605; G01R 3/00; G01R 5/00

See application file for complete search history.

(56) References Cited

U.S. PATENT DOCUMENTS

| | | | | |
|---|---|---|---|---|
| 9,589,171 | B1* | 3/2017 | Larsson | G06K 9/0002 |
| 2009/0115742 | A1* | 5/2009 | Mamba | G06F 3/044 345/174 |
| 2010/0303311 | A1* | 12/2010 | Shin | G06K 9/00013 382/124 |
| 2011/0175835 | A1* | 7/2011 | Wang | G06F 3/0416 345/173 |
| 2013/0181949 | A1 | 7/2013 | Setlak | |
| 2014/0294261 | A1 | 10/2014 | Abe | |
| 2014/0333328 | A1* | 11/2014 | Nelson | G06K 9/0002 324/663 |
| 2015/0116608 | A1 | 4/2015 | Jeong | |
| 2015/0135108 | A1* | 5/2015 | Pope | A63F 13/537 715/767 |
| 2015/0235098 | A1* | 8/2015 | Lee | G06F 3/0484 715/709 |
| 2016/0011767 | A1 | 1/2016 | Jung et al. | |
| 2016/0357289 | A1 | 12/2016 | Jeong | |

FOREIGN PATENT DOCUMENTS

| | | |
|---|---|---|
| CN | 105867712 A | 8/2016 |
| CN | 105893955 A | 8/2016 |
| EP | 1617386 A1 | 1/2006 |
| EP | 2911091 A2 | 8/2015 |
| EP | 3032385 A1 | 6/2016 |
| EP | 3252590 A1 | 12/2017 |
| GN | 105893955 A | 8/2016 |
| GN | 106020671 A | 10/2016 |
| JP | 2004171307 A | 6/2004 |
| KR | 20150056353 A | 5/2015 |
| KR | 20150098158 A | 8/2015 |
| RU | 2005129771 A | 4/2007 |
| WO | 2016015034 A1 | 1/2016 |
| WO | 2016133602 A1 | 8/2016 |
| WO | 2016154905 A1 | 10/2016 |

OTHER PUBLICATIONS

First Office Action (including English translation) and search report issued in corresponding Chinese Application No. 201710032068.1, dated Mar. 14, 2019, 11 pages.

International Search Report (including English translation) issued in corresponding International Application No. PCT/CN2017/096433, dated Nov. 9, 2017, 4 pages.

Office Action issued in corresponding Russian Application No. 2017145948/08(078602), dated Aug. 15, 2018, 6 pages.

European Extended Search Report issued in corresponding EP Patent Application No. 18152161.8, dated Oct. 2, 2018, 12 pages.

Pranav Koundinya et al: "Multi resolution touch panel with built-in fingerprint sensing support", Design, Automation & Test in Europe, European Design and Automation Association, IMEC VZW, Kapeldreef 75 Leuven Belgium, Mar. 24, 2014, pp. 1-6.

International Search Report issued in corresponding International Application No. PCT/CN2017/096433, dated Nov. 9, 2017, 5 pages.

Search Report in corresponding European Patent Application No. 18152161.8, dated Jun. 4, 2018, 11 pages.

Notification of Reasons for Refusal issued in corresponding Japanese Application No. 2017-553165, dated Mar. 5, 2019, 5 pages.

First Office Action issued to Korean Patent Application No. 10-2018-7032773 dated Jan. 16, 2020 with English translation, (14p).

Second Office Action issued to EP Application No. 18152161.8 dated Nov. 9, 2021, (5p).

Hao Lu, et al., "Gesture On: Enabling Always-On Touch Gestures for Fast Mobile Access from the Device Standby Mode", Google Inc., Gesture Elicitation & Recognition, CHI 2015, Crossings, Seoul, Korea, (10p).

* cited by examiner

FINGERPRINT IDENTIFICATION METHOD AND APPARATUS

CROSS-REFERENCE TO RELATED APPLICATION

This application claims priority to Chinese Patent Application No. 201710032068.1, filed on Jan. 17, 2017, the entire contents of which are incorporated herein by reference.

TECHNICAL FIELD

The present disclosure relates to the field of terminal technology, and more particularly, to a fingerprint identification method and apparatus.

BACKGROUND

With the rapid development of terminal technology, a terminal may provide users with information protection through a fingerprint identification function to ensure information security of the users. The user may enroll his/her own fingerprint in the terminal in advance, and the next operation will be performed only when a fingerprint identified by the terminal is the same as the enrolled fingerprint. When a fingerprint identified by the terminal is different from the fingerprint of the user, it may be considered that the information of the user may have been stolen. In this case, the terminal will not continue to perform the next step, thus ensuring the information security of the user.

Currently, the terminal may include a groove below a display screen of the terminal or below a rear camera of the terminal. When the user needs to use the fingerprint identification function of the terminal, he/she may press the finger in the groove. Accordingly, when the terminal detects a touch operation applied to the groove, the finger pressed at the groove may be imaged, and the resulting fingerprint image may be compared with a stored fingerprint image, and then a corresponding operation is performed based on a comparison result.

However, the terminal may initiate the fingerprint identification function from time to time when the user actually does not intend to activate the fingerprint identification function. Thus, there is a need to improve the fingerprint identification function so that the terminal would not waste battery power on the improper start.

SUMMARY

The present disclosure provides a fingerprint identification method and apparatus.

According to a first aspect of the present disclosure, there is provided a fingerprint identification method. The method may include: when a touch operation for fingerprint identification is detected on a display screen, determining an acting area and a touch position of the touch operation on the display screen; and determining a fingerprint image corresponding to the touch operation and performing the fingerprint identification, when the acting area is greater than or equal to a first preset area threshold and the touch position is located in a preset identification region on the display screen.

According to a second aspect of the present disclosure, there is provided a fingerprint identification apparatus. The apparatus may include: a first determining module configured to, when a touch operation for fingerprint identification is detected on a display screen, determine an acting area and a touch position of the touch operation on the display screen; and a second determining module configured to determine a fingerprint image corresponding to the touch operation and perform the fingerprint identification, when the acting area is greater than or equal to a first preset area threshold and the touch position is located in a preset identification region on the display screen.

According to a third aspect of the present disclosure, there is provided a fingerprint identification apparatus, including: a processor; and a memory for storing instructions executable by the processor. The processor is configured to perform: when a touch operation for fingerprint identification is detected on a display screen, determining an acting area and a touch position of the touch operation on the display screen; and determining a fingerprint image corresponding to the touch operation and performing the fingerprint identification, when the acting area is greater than or equal to a first preset area threshold and the touch position is located in a preset identification region on the display screen.

According to a fourth aspect of the present disclosure, there is provided a non-transitory readable storage medium including instructions, executable by a processor in a terminal, for performing acts including: when a touch operation for fingerprint identification is detected on a display screen, determining an acting area and a touch position of the touch operation on the display screen; and determining a fingerprint image corresponding to the touch operation and performing the fingerprint identification, when the acting area is greater than or equal to a first preset area threshold and the touch position is located in a preset identification region on the display screen.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Prior to the detailed explanation of embodiments of the present disclosure, application scenarios of the embodiments of the present disclosure will be described firstly. When a user needs to perform fingerprint identification through a terminal, he/she will usually press a finger at a groove for fingerprint identification of the terminal. Then the terminal may collect a fingerprint image corresponding to the touch operation generated by the finger press, and compare it with a stored fingerprint image, to perform the fingerprint identification. However, in the process of fingerprint identification performed by the terminal, factors, such as a contact area applied to the display screen by the finger of the user being too small, or a touch position of the finger of the user being not located in a region for fingerprint identification of the terminal, may cause that the terminal cannot effectively collect the fingerprint image, thus reducing the accuracy of fingerprint identification. Meanwhile, the terminal needs to collect the fingerprint image for many times, and the fingerprint image comparison needs to be performed for many times, thereby increasing the power consumption of the terminal. Thus, the embodiments of the present disclosure provide a fingerprint identification method. When the user performs the fingerprint identification through the terminal, the accuracy of the fingerprint identification may be improved, and the power consumption of the terminal may be reduced.

Figure 1:
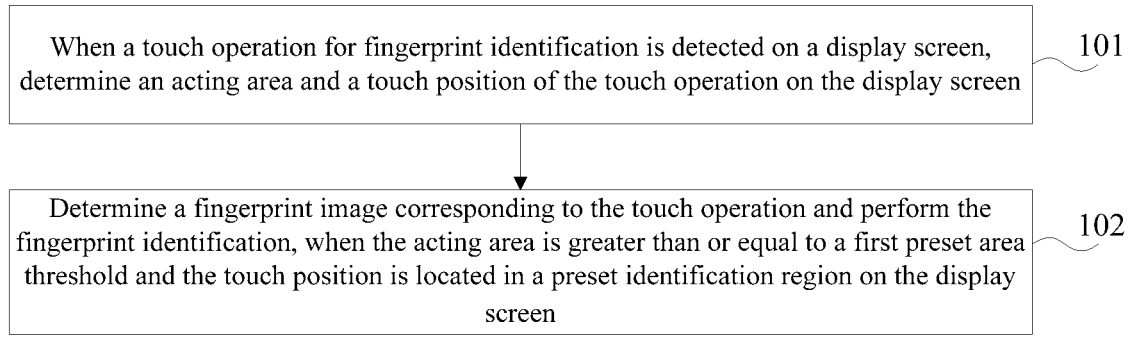
FIG. 1 is a flow chart of a fingerprint identification method according to an aspect of the disclosure.

FIG. 1 is a flow chart of a fingerprint identification method according to an aspect of the disclosure. As shown in FIG. 1, the fingerprint identification method is applied in a terminal and includes following steps.

In step 101, when a touch operation for fingerprint identification is detected on a display screen, an acting area and a touch position of the touch operation on the display screen are determined.

In step 102, when the acting area is greater than or equal to a first preset area threshold and the touch position is located in a preset identification region on the display screen, a fingerprint image corresponding to the touch operation is determined and the fingerprint identification is performed.

In one or more embodiments of the present disclosure, when a touch operation for fingerprint identification is detected on a display screen, an acting area and a touch position of the touch operation on the display screen may be determined. Afterwards, when the acting area is greater than or equal to a first preset area threshold and the touch position is located in a preset identification region, a fingerprint image corresponding to the touch operation may be determined and the fingerprint identification may be performed. That is, the fingerprint identification is performed when parameters of the touch operation of the user meet certain conditions, which may improve an accuracy of fingerprint identification. Besides, there is no need to determine the fingerprint image corresponding to the touch operation time and time again, thereby reducing power consumption of the terminal.

Alternatively or additionally, before determining the fingerprint image corresponding to the touch operation and performing the fingerprint identification, when the acting area is greater than or equal to the first preset area threshold and the touch position is located in the preset identification region, the method further includes:

determining an acting duration of the touch operation on the display screen; and correspondingly, the determining the fingerprint image corresponding to the touch operation and performing the fingerprint identification, when the acting area is greater than or equal to the first preset area threshold and the touch position is located in the preset identification region includes:

determining the fingerprint image corresponding to the touch operation and performing the fingerprint identification, when the acting area is greater than or equal to the first preset area threshold, the touch position is located in the preset identification region and the acting duration is longer than a preset duration.

Alternatively or additionally, determining the acting area and the touch position of the touch operation on the display screen includes:

for each of a plurality of cross electrodes on the display screen, detecting a capacitance of the cross electrode when the touch operation is applied to the display screen;

determining a difference value between the capacitance of the cross electrode and a reference capacitance of the cross electrode when the touch operation is applied to the display screen, to obtain a capacitance difference value of the cross electrode;

when a capacitance difference value of at least one of the plurality of cross electrodes exceeds a first preset capacitance, determining a position of the at least one cross electrode on the display screen;

determining a region area surrounded by the position of the at least one cross electrode on the display screen as the acting area of the touch operation on the display screen; and determining a region position surrounded by the position of the at least one cross electrode on the display screen as the touch position of the touch operation.

Alternatively or additionally, determining the touch position of the touch operation on the display screen includes:

determining a current generated by a first electrode, a current generated by a second electrode, a current generated by a third electrode, and a current generated by a fourth electrode, when the touch operation is applied to the display screen, the first electrode, the second electrode, the third electrode, and the fourth electrode being electrodes respectively provided at a first preset position, a second preset position, a third preset position, and a fourth preset electrode of a terminal where the display screen is located; and determining the touch position of the touch operation on the display screen based on a current generated by any three adjacent electrodes among the first electrode, the second electrode, the third electrode and the fourth electrode.

Alternatively or additionally, before determining the fingerprint image corresponding to the touch operation and performing the fingerprint identification, when the acting area is greater than or equal to the first preset area threshold and the touch position is located in the preset identification region, the method further includes:

determining that the touch position is located in the preset identification region, when a center point of the touch position is within the preset identification region; or determining that the touch position is located in the preset identification region, when a distance between a center point of the touch position and a center point of the preset identification region is smaller than a preset distance.

Alternatively or additionally, the method further includes:

determining a prompting mode when the fingerprint identification is performed and an identification result is determined, and prompting the identification result through the prompting mode; or determining a prompting mode at the time of determining the fingerprint image corresponding to the touch operation and performing the fingerprint identification, and when the fingerprint identification is performed and an identification result is determined, prompting the identification result through the prompting mode.

All of the optional embodiments described above may be formed in any combination to form optional embodiments of the present disclosure, which will not be repeatedly one by one in the embodiments of the present disclosure.

Figure 2A:
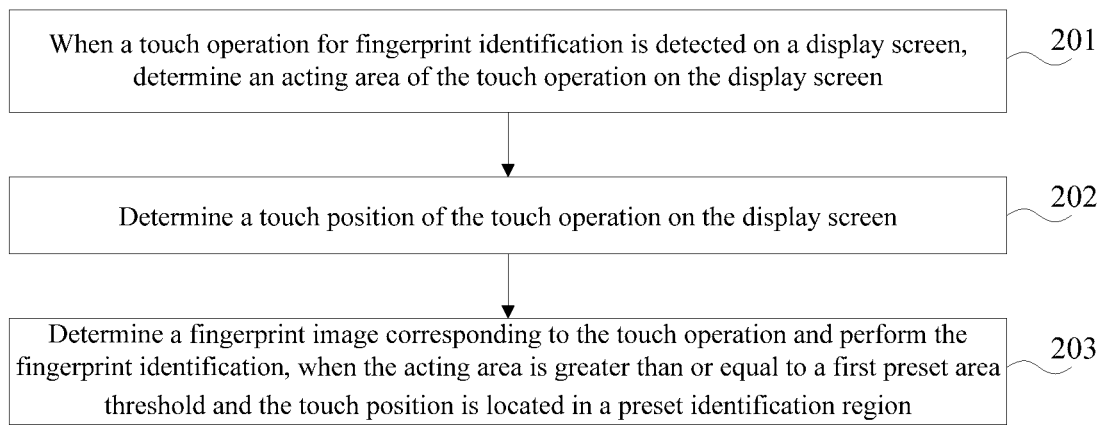
FIG. 2A is a flow chart of another fingerprint identification method according to an aspect of the disclosure.

FIG. 2A is a flow chart of a fingerprint identification method according to an aspect of the disclosure. As shown in FIG. 2A, the fingerprint identification method is applied in a terminal and includes following steps.

In step 201, when a touch operation for fingerprint identification is detected on a display screen, an acting area of the touch operation on the display screen is determined.

In one or more embodiments, the implementation of the step may be as follows: for each of a plurality of cross electrodes on the display screen, detecting a capacitance of the cross electrode when the touch operation is applied to the display screen; determining a difference value between the capacitance of the cross electrode and a reference capacitance of the cross electrode when the touch operation is applied to the display screen, to obtain a capacitance difference value of the cross electrode; when a capacitance difference value of at least one of the plurality of cross electrodes exceeds a first preset capacitance, determining a position of the at least one cross electrode on the display screen; and determining a region area surrounded by the position of the at least one cross electrode on the display screen as the acting area of the touch operation on the display screen.

Figure 2B:
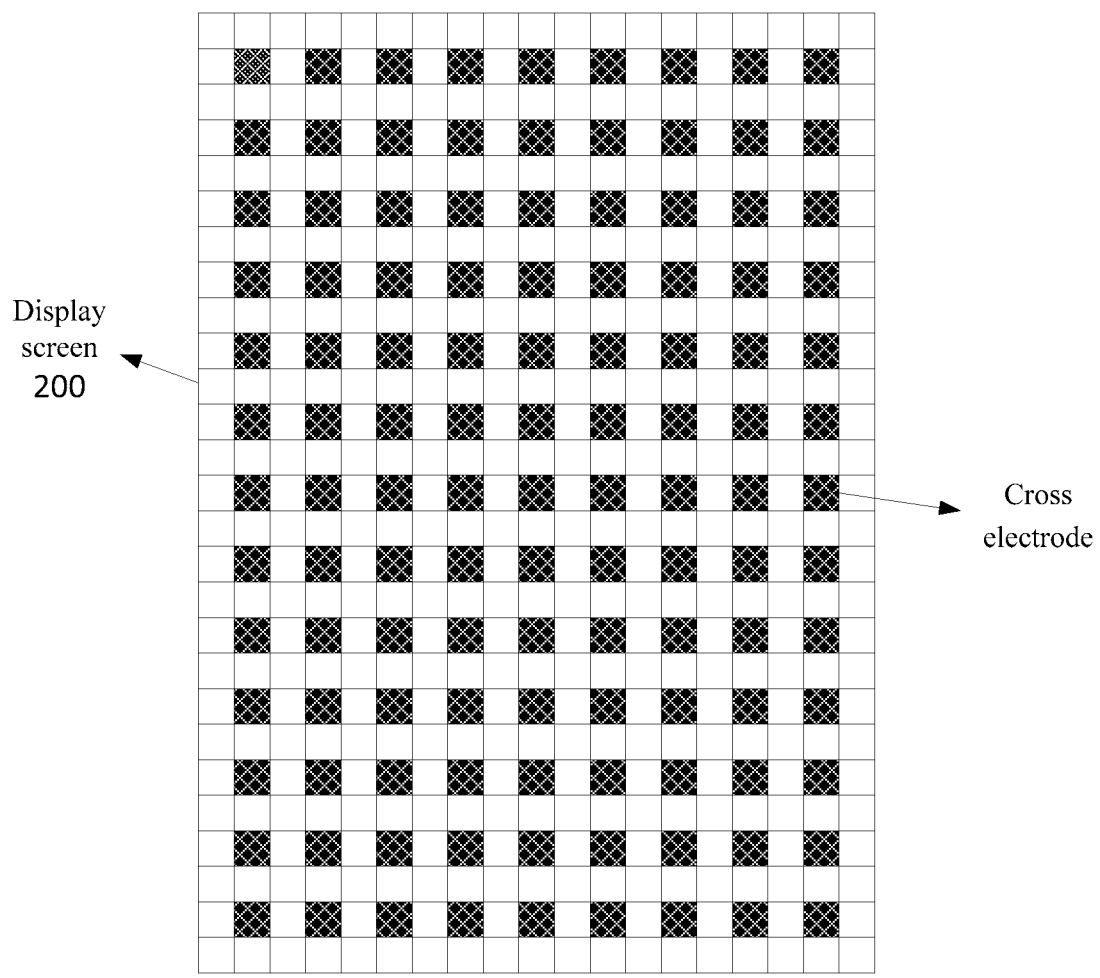
FIG. 2B is a schematic diagram of a distribution of a plurality of cross electrodes on a display screen according to an aspect of the disclosure.

As shown in FIG. 2B, a plurality of cross electrodes may be provided on the display screen 200 of the terminal. When the touch operation on the display screen 200 is detected by the terminal, a capacitance of the cross electrode(s) of the plurality of cross electrodes at the touch position may change. Therefore, the capacitance of the cross electrode whose capacitance has been changed will be larger than its reference capacitance. When a capacitance difference value between the capacitance and the reference capacitance of the cross electrode exceeds a first preset capacitance, it may be considered to be an effective touch operation, such that the terminal may determine a position(s) of the cross electrode(s) whose capacitance difference value(s) exceeds the preset capacitance, and then determine a region area surrounded by the determined position(s) as the acting area of the touch operation on the display screen 200. In one or more embodiments, the reference capacitance of the cross electrode is a capacitance when the cross electrode is not touched.

Further, the terminal may also determine the acting area of the touch operation on the display screen 200 by following manners, including: performing detection many times on the acting area of the touch operation on the display screen 200 within a designated time period, to obtain a plurality of acting areas. The designated time period is a time period from a current time to a time when a preset duration has elapsed since the current time. The acting area which is detected at latest among the plurality of acting areas is determined as the acting area of the touch operation on the display screen 200. Since the generation of the touch operation lasts for a period of time, the accuracy of determining the acting area may be improved by the terminal determining the acting area of the touch operation on the display screen 200 according to the above-described periodic detection manner.

In step 202, a touch position of the touch operation on the display screen is determined.

On the basis of determining the position of the at least one cross electrode on the display screen in step 201, the implementation of the terminal determining the touch position of the touch operation on the display screen may be: determining a region position surrounded by the position of the at least one cross electrode on the display screen as a touch position of the touch operation.

In addition, the terminal may also determine a touch position of the touch operation on the display screen by performing following steps (1) and (2).

Step (1): a current generated by a first electrode, a current generated by a second electrode, a current generated by a third electrode, and a current generated by a fourth electrode, when the touch operation is applied to the display screen are determined, the first electrode, the second electrode, the third electrode, and the fourth electrode being electrodes respectively provided at a first preset position, a second preset position, a third preset position, and a fourth preset electrode of a terminal where the display screen is located.

In practical applications, usually, the first electrode, the second electrode, the third electrode and the fourth electrode may be provided at an upper left corner, an upper right corner, a lower right corner and a lower left corner of the terminal, respectively, and the electric charge may be supplemented by the four electrodes.

Step (2): a touch position of the touch operation on the display screen is determined based on a current generated by any three adjacent electrodes among the first electrode, the second electrode, the third electrode and the fourth electrode.

In one or more embodiments, based on the current generated by any three adjacent electrodes among the first electrode, the second electrode, the third electrode and the fourth electrode, the terminal may determine a horizontal coordinate of the touch by the following equation (2-1), determine a vertical coordinate of the touch by the following equation (2-2), and determine a touch position indicated by the horizontal coordinate of the touch and the vertical coordinate of the touch as the touch position of the touch operation on the display screen.

$$L_{bx} = \frac{i_b L_x}{i_a + i_b} \qquad (2\text{-}1)$$

$$L_{by} = \frac{i_b L_y}{i_c + i_b} \qquad (2\text{-}2)$$

In the above formulas, $L_{bx}$ is the horizontal coordinate of the touch, $i_b$ is a current generated by an electrode at a middle position of any three adjacent electrodes, $L_x$ is a top side length or a bottom side length of the display screen, $i_a$ is a current generated by an electrode which has the same horizontal coordinate as the electrode at the middle position among the any three adjacent electrodes, $L_{by}$ is the vertical coordinate of the touch, $L_y$ is a left side length or a right side length of the display screen, and $i_c$ is a current generated by an electrode which has the same vertical coordinate as the electrode at the middle position among the any three adjacent electrodes. In one or more embodiments, as for a terminal equipped with a fingerprint identification module, since the top side length or the bottom side length of the display screen of the terminal and the left side length or the right side length of the display screen of the terminal are determined upon leaving the factory, when the present method is executed by the terminal, the top side length or the bottom side length $L_x$ of the display screen and the left side length or the right side length $L_y$ of the display screen are both known.

Figure 2C:
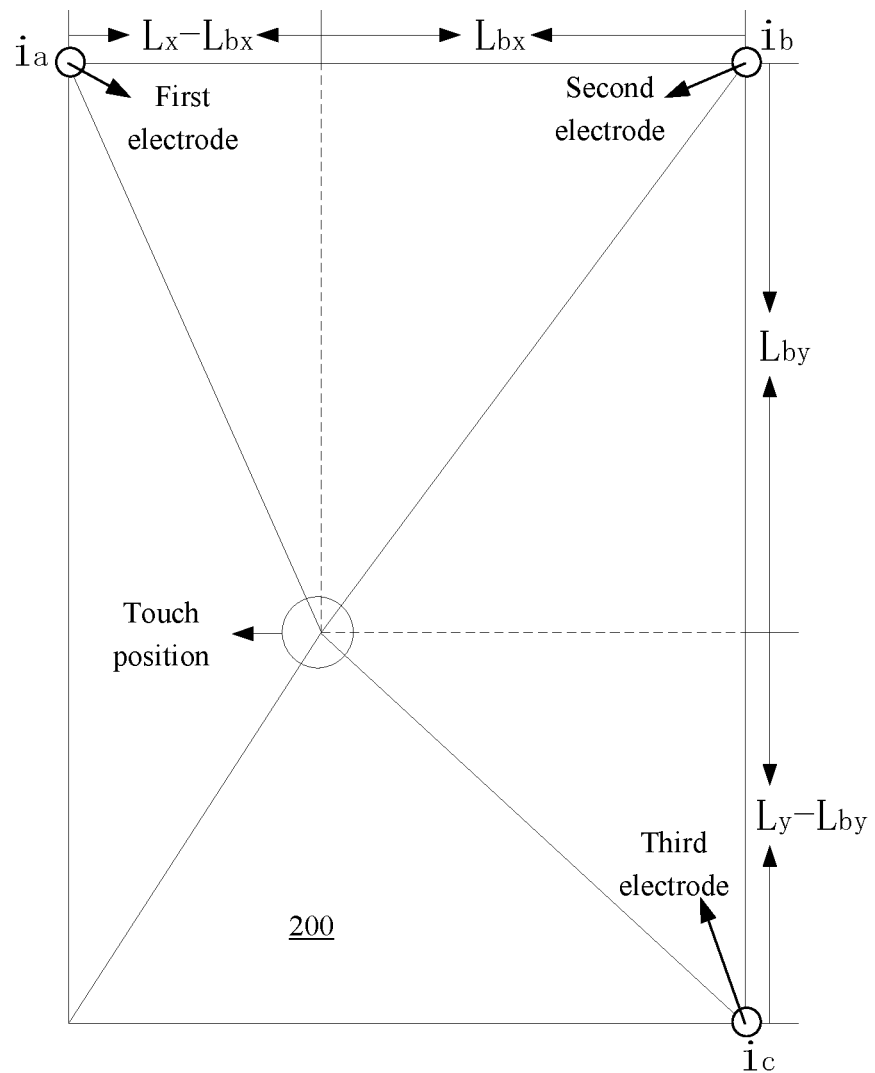
FIG. 2C is a schematic diagram of determining a coordinate of a touch position according to an aspect of the disclosure.

As shown in FIG. 2C, the any three adjacent electrodes may be a first electrode located at the upper left corner of the display screen 200, a second electrode located at the upper right corner of the display screen 200, and a third electrode located at the lower right corner of the display screen 200, respectively. In one or more embodiments, the second electrode is an electrode located at the middle position among the three electrodes, and the current generated by the second electrode is $i_b$. The first electrode is the electrode which has the same horizontal coordinate as the second electrode, and the current generated by the first electrode is $i_a$. The third electrode is the electrode which has the same vertical coordinate as the second electrode, and the current generated by the third electrode is $i_c$. In one or more embodiments, a distance between the first electrode and the second electrode is the top side length or the bottom side length $L_x$ of the display screen 200, and a distance between the second electrode and the third electrode is the left side length or the right side length $L_y$ of the display screen 200.

Here, when the touch operation for fingerprint identification is detected on the display screen, the terminal may firstly determine the acting area of the touch operation on the display screen and then determine the touch position of the touch operation on the display screen. The terminal may also firstly determine the touch position of the touch operation on the display screen and then determine the acting area of the touch operation on the display screen. The order of the terminal determining the acting area and the touch position of the touch operation on the display screen is not limited by the embodiments of the present disclosure.

To this end, the terminal may determine the acting area and the touch position of the touch operation for performing the fingerprint identification on the display screen by the above step 201 to the step 202, and then the terminal may determine the fingerprint image corresponding to the touch operation and perform the fingerprint identification by step 203.

In step 203, when the acting area is greater than or equal to a first preset area threshold and the touch position is located in a preset identification region on the display screen, a fingerprint image corresponding to the touch operation is determined and the fingerprint identification s performed.

The terminal firstly determines whether the acting area is greater than or equal to the first preset area threshold and whether the touch position is located in the preset identification region. When the acting area is smaller than the first preset area threshold or the touch position is not located in the preset identification region, the terminal may end the operation. When the acting area is greater than or equal to a first preset area threshold and the touch position is located in a preset identification region, the fingerprint image corresponding to the touch operation is collected by a fingerprint collector, and the collected fingerprint image is compared with a stored fingerprint image to perform the fingerprint identification. When the collected fingerprint image coincides with the stored fingerprint image, it is determined that the fingerprint identification is successful. When the collected fingerprint image does not coincide with the stored fingerprint image, it is determined that the fingerprint identification is unsuccessful.

In this disclosure, the preset identification region is a display region where the terminal performs the fingerprint image collection. The preset identification region may be a region of the entire display screen. In practical applications, in order to reduce the power consumption when the terminal collects the fingerprint image, it is unnecessary to scan the entire display screen. The preset identification region may also be a region on the display screen corresponding to the fingerprint collector installed at the terminal, that is, the preset identification region is a portion of the region on the display screen.

When the acting area is greater than or equal to the first preset area threshold, the terminal may determine that a contact area of the finger of the user and the display screen is sufficiently large. When the touch position is located in the preset identification region, the terminal may determine that the terminal can effectively collect the fingerprint image of the user. Afterwards, the terminal may determine a fingerprint image corresponding to the touch operation and perform the fingerprint identification, thus greatly improving the accuracy of the fingerprint identification. On the other hand, when the acting area is smaller than the first preset area threshold or the touch position is not located in the preset identification region, it may be considered that the user only softly touched the screen, or the fingerprint image of the user cannot be effectively collected. At this time, the terminal may end the operation, and it is unnecessary to determine the fingerprint image corresponding to the touch operation, and it is unnecessary to perform the fingerprint identification, such that the power consumption of the terminal may be reduced.

In one or more embodiments, the terminal may determine whether the touch position is located in the preset identification region by following two manners.

In the first manner, it is determined whether a center point of the touch position is within the preset identification region. When the center point of the touch position is within the preset identification region, it is determined that the touch position is located in the preset identification region. When the center point of the touch position is not within the preset identification region, it is determined that the touch position is not located in the preset identification region.

When the center point of the touch position is within the preset identification region, it may be considered that the user presses the majority of the finger in the preset identification region of the display screen. Then, when the terminal identifies the fingerprint image corresponding to the touch operation, the accuracy of the identification may be greatly improved, and the number of times for scanning the fingerprint may be reduced, thereby reducing the power consumption of the terminal.

In the second manner, a distance between a center point of the touch position and a center point of the preset identification region is determined. When the distance between the center point of the touch position and the center point of the preset identification region is smaller than a preset distance, it is determined that the touch position is located in the preset identification region. When the distance between the center point of the touch position and the center point of the preset identification region is larger than or equal to a preset distance, it is determined that the touch position is not located in the preset identification region.

When the distance between the center point of the touch position and the center point of the preset identification region is smaller than the preset distance, it may also be considered that the user presses the majority of the finger in the preset identification region of the display screen. Then, when the terminal identifies the fingerprint image corresponding to the touch operation, the accuracy of the identification may be greatly improved, and the number of times for scanning the fingerprint may be reduced, thereby reducing the power consumption of the terminal.

Further, the terminal may further perform following steps on the basis of determining the acting area of the touch operation on the display screen by the periodic detection manner, including: when the acting area is greater than or equal to the first preset area threshold, the touch position is located in the preset identification region and a factor of generating the touch operation is a preset factor, determining the fingerprint image corresponding to the touch operation and performing the fingerprint identification.

Since in practical applications, the factor of generating the touch operation may be divided into three kinds of factors, i.e., the user touching the display screen with the finger, the user touching the display screen with a finger wearing a glove, and the user touching the display screen with an item. Among the above three kinds of factors, only the factor that the user touches the display screen with the finger may allow the terminal to collect the fingerprint. Therefore, the terminal may determine the factor that the user touches the display screen with the finger as a preset factor. In addition, since variation tendency of the acting area and center point distribution of the acting area of the touch operation respectively generated by the three kinds of factors are different from each other, the terminal may further determine which kind of factor that the touch operation belongs to according to the variation tendency of the acting area and the center point distribution of the acting area of the touch operation on the basis of determining the acting area of the touch operation. In this way, when the acting area is greater than or equal to the first preset area threshold, the touch position is located in the preset identification region and a factor of generating the touch operation is a preset factor, the terminal may determine the fingerprint image corresponding to the touch operation and perform the fingerprint identification.

Correspondingly, before determining a fingerprint image corresponding to the touch operation and performing the fingerprint identification when the acting area is greater than or equal to a first preset area threshold, the touch position is located in a preset identification region and a factor of generating the touch operation is a preset factor, the terminal may determine whether the factor of generating the touch operation is a preset factor through following steps on the basis of determining the acting area of the touch operation on the display screen by a periodic detection manner, including: ordering the plurality of acting areas detected within the designated time period according to detecting time, determining a region area surrounded by cross electrode(s) in the touch position whose capacitance difference value exceeds a second preset capacitance, the second preset capacitance being larger than the first preset capacitance. When the plurality of acting areas after being ordered are successively increased and the region area is smaller than a second preset area threshold, it is determined that the factor of generating the touch operation is the preset factor, the second preset area threshold being smaller than the first preset area threshold. When the plurality of acting areas after being ordered are not successively increased or the region area is larger than or equal to the second preset area threshold, it is determined that the factor of generating the touch operation is not the preset factor.

When the user uses the finger to touch the display screen, there is a touch process. During the touch process, an intensity of the finger will gradually increase, thereby there will also be a process of the acting area changing from small to large. In addition, because a finger prominence (finger pad) of the finger has curvature, a touch pressure applied on the display screen by the finger prominence of the finger is the largest when the user uses the finger to touch the display screen. Compared with other factors of generating the touch operation, an area of the finger prominence applied on the display screen is small. Therefore, the terminal may perform the above-described steps, to determine whether the factor of generating the touch operation is the preset factor. When it is determined that the factor of generating the touch operation is the preset factor on the basis of the acting area being greater than or equal to the first preset area threshold and the touch position being located in the preset identification region, the accuracy of fingerprint identification can be further improved.

In addition, since the terminal may further determine an acting duration of the touch operation on the display screen on the basis of determining the acting area and the touch position of the touch operation on the display screen, the terminal may also perform following steps, including: determining a fingerprint image corresponding to the touch operation and performing the fingerprint identification, when the acting area is greater than or equal to the first preset area threshold, the touch position is located in the preset identification region and the acting duration is longer than a preset duration.

During the process of collecting the fingerprint image, if the acting duration of the touch operation is longer, i.e., the finger of the user may remain stationary to the greatest extent, then the collected fingerprint image will be more clearly. Therefore, when the terminal further determines that the acting duration of the touch operation on the display screen is longer than the preset duration on the basis of determining that the acting area is greater than or equal to the first preset area threshold and the touch position is located in the preset identification region, the accuracy of collecting and identifying the fingerprint image corresponding to the touch operation may be further improved.

Further, before the terminal executes the step 203, the terminal may further determine the acting duration of the touch operation on the display screen on the basis of determining the acting area and the touch position of the touch operation on the display screen, and then the terminal may determine whether the acting area, the touch position and the acting duration of the touch operation on the display screen meet certain conditions. In this way, when the acting area, the touch position and the acting duration of the touch operation on the display screen all meet certain conditions, the fingerprint image corresponding to the touch operation will be determined and the fingerprint identification will be performed. Since the terminal will perform the fingerprint identification only when determining that the acting area, the touch position and the acting duration of the touch operation on the display screen all meet certain conditions, there is no need to perform the fingerprint identification operation time and time again. Therefore, the efficiency and accuracy of the fingerprint identification will be improved. Meanwhile, the more factors that the terminal determines to meet the conditions, the higher the accuracy of the fingerprint identification will be.

In addition, the terminal may further determine a prompting mode when the fingerprint identification is performed and an identification result is determined, and prompt the identification result through the prompting mode; or determine a prompting mode at the time of determining the fingerprint image corresponding to the touch operation and performing the fingerprint identification, and when the fingerprint identification is performed and an identification result is determined, prompt the identification result through the prompting mode.

After a display screen module of the terminal determines that the parameters of the touch operation meet certain conditions, it may send an identification message to a fingerprint module of the terminal, to cause the fingerprint module to identify the fingerprint. After the fingerprint module of the terminal performs the fingerprint identification and obtains an identification result, it will send an identification completing message to a host of the terminal. Upon reception of the identification completing message, the host may determine at least one of the operations such as screen wake-up, vibration, playing sound and the displaying animation, and may determine at least one of the determined operations as the prompting mode, thus, it is possible to prompt the user to view the fingerprint identification result by the prompting mode. In addition, the identification completing message may carry no fingerprint identification result, that is, the host may perform the same prompting operation no matter the identification result is consistence or inconsistence, so that the user may learn about the fingerprint identification result by the displayed identification result message after viewing the prompt. In practical applications, the identification completing message may carry the fingerprint identification result, in this way, when receiving the identification completing message, the host may carry out different prompting operations according to the fingerprint identification result carried by the identification completing message, and thus, the user may directly learn about the fingerprint identification result through different prompting messages, such as sound effect, animation and so on.

In addition, in practical applications, after determining that the parameters of the touch operation satisfy certain conditions, the display screen module of the terminal may also send a prompting preparation message to the host while sending the identification message to the fingerprint module, so that the host may determine the prompting mode to be performed in advance. Then, when the host receives the identification completing message sent by the fingerprint module, it may immediately prompt the user to view the fingerprint identification result by the prompting mode determined in advance, thereby shortening entire response time of the terminal and improving the efficiency of executing the prompting operation by the terminal.

In one or more embodiments of the present disclosure, when a touch operation for fingerprint identification is detected on a display screen, an acting area, a touch position and an acting duration of the touch operation on the display screen may be determined. Afterwards, when the acting area is greater than or equal to a first preset area threshold, the touch position is located in a preset identification region and the acting duration is longer than a preset duration, a fingerprint image corresponding to the touch operation may be determined and the fingerprint identification may be performed. That is, the fingerprint identification is performed when parameters of the touch operation of the user meet certain conditions, which may improve accuracy of fingerprint identification. Besides, there is no need to determine the fingerprint image corresponding to the touch operation time and time again, thereby reducing power consumption of the terminal.

Figure 3A:
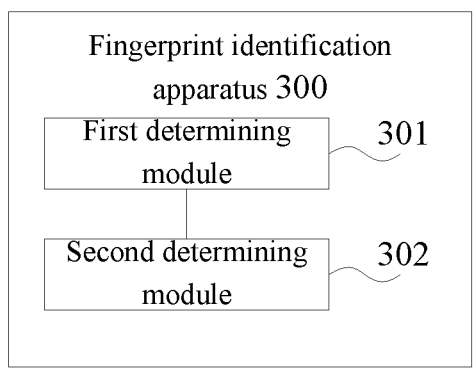
FIG. 3A is a block diagram of a fingerprint identification apparatus according to an aspect of the disclosure.

FIG. 3A is a block diagram of a fingerprint identification apparatus 300 provided by an exemplary embodiment of the present disclosure. Referring to FIG. 3A, the apparatus includes: a first determining module 301 and a second determining module 302.

The first determining module 301 is configured to, when a touch operation for fingerprint identification is detected on a display screen, determine an acting area and a touch position of the touch operation on the display screen.

The second determining module 302 is configured to determine a fingerprint image corresponding to the touch operation and perform the fingerprint identification, when the acting area is greater than or equal to a first preset area threshold and the touch position is located in a preset identification region on the display screen.

Figure 3B:
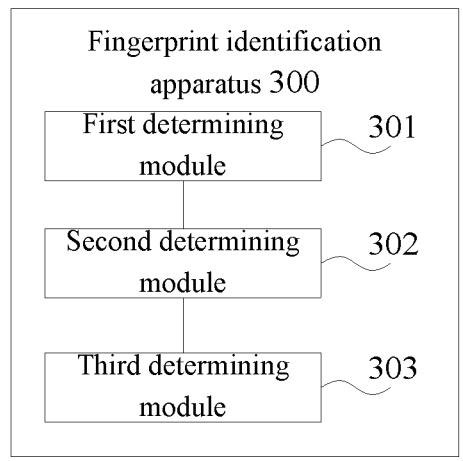
FIG. 3B is a block diagram of another fingerprint identification apparatus according to an aspect of the disclosure.

Alternatively or additionally, referring to FIG. 3B, the apparatus further includes: a third determining module 303.

The third determining module 303 is configured to determine an acting duration of the touch operation on the display screen.

Correspondingly, the second determining module 302 includes a first determining sub-module.

The first determining sub-module is configured to determine a fingerprint image corresponding to the touch operation and perform the fingerprint identification, when the acting area is greater than or equal to the first preset area threshold, the touch position is located in the preset identification region and the acting duration is longer than a preset duration.

Figure 3C:
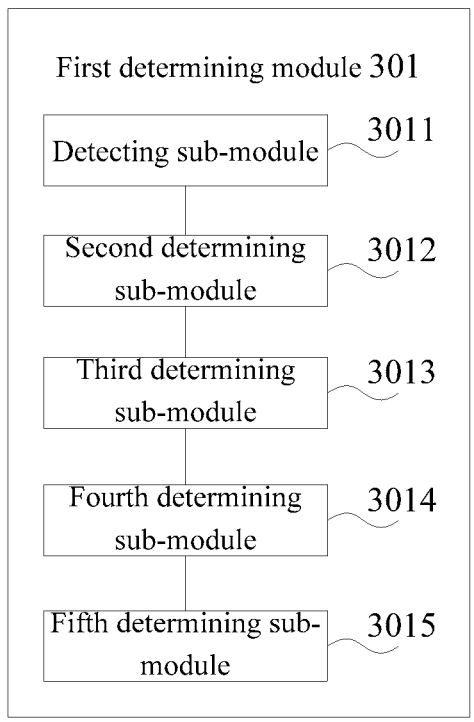
FIG. 3C is a block diagram of a first determining module according to an aspect of the disclosure.

Alternatively or additionally, referring to FIG. 3C, the first determining module 301 includes: a detecting sub-module 3011, a second determining sub-module 3012, a third determining sub-module 3013, a fourth determining sub-module 3014 and a fifth determining sub-module 3015.

The detecting sub-module 3011 is configured to, for each of a plurality of cross electrodes on the display screen, detect a capacitance of the cross electrode when the touch operation is applied to the display screen.

The second determining sub-module 3012 is configured to determine a difference value between the capacitance of the cross electrode and a reference capacitance of the cross electrode, when the touch operation is applied to the display screen, to obtain a capacitance difference value of the cross electrode.

The third determining sub-module 3013 is configured to, when a capacitance difference value of at least one of the plurality of cross electrodes exceeds a first preset capacitance, determine a position of the at least one cross electrode on the display screen.

The fourth determining sub-module 3014 is configured to determine a region area surrounded by the position of the at least one cross electrode on the display screen as an acting area of the touch operation on the display screen.

The fifth determining sub-module 3015 is configured to determine a region position surrounded by the position of the at least one cross electrode on the display screen as a touch position of the touch operation.

Figure 3D:
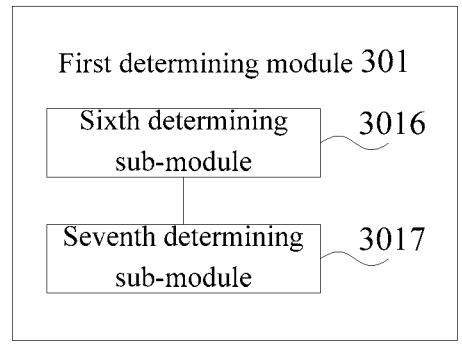
FIG. 3D is a block diagram of another first determining module according to an aspect of the disclosure.

Alternatively or additionally, referring to FIG. 3D, the first determining module 301 includes: a sixth determining sub-module 3016 and a seventh determining sub-module 3017.

The sixth determining sub-module 3016 is configured to determine a current generated by a first electrode, a current generated by a second electrode, a current generated by a third electrode, and a current generated by a fourth electrode, when the touch operation is applied to the display screen, the first electrode, the second electrode, the third electrode, and the fourth electrode being electrodes respectively provided at a first preset position, a second preset position, a third preset position, and a fourth preset position of a terminal where the display screen is located.

The seventh determining sub-module 3017 is configured to determine a touch position of the touch operation on the display screen based on a current generated by any three adjacent electrodes of the first electrode, the second electrode, the third electrode and the fourth electrode.

Figure 3E:
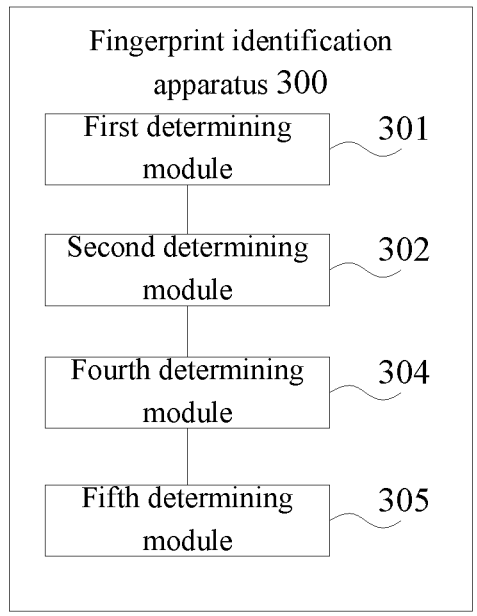
FIG. 3E is a block diagram of a third fingerprint identification apparatus according to an aspect of the disclosure.

Alternatively or additionally, referring to FIG. 3E, the apparatus further includes: a fourth determining module 304 or a fifth determining module 305.

The fourth determining module 304 is configured to determine that the touch position is located in the preset identification region, when a center point of the touch position is within the preset identification region.

The fifth determining module 305 is configured to determine that the touch position is located in the preset identification region, when a distance between the center point of the touch position and a center point of the preset identification region is smaller than a preset distance.

Figure 3F:
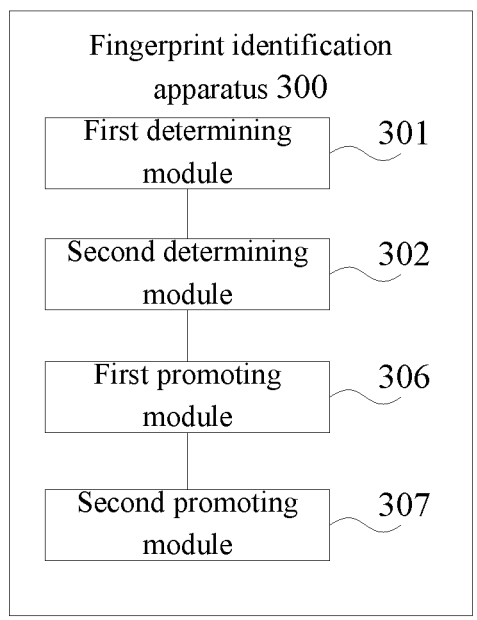
FIG. 3F is a block diagram of a fourth fingerprint identification apparatus according to an aspect of the disclosure.

Alternatively or additionally, referring to FIG. 3F, the apparatus further includes: a first promoting module 306 or a second promoting module 307.

The first promoting module 306 is configured to determine a prompting mode when the fingerprint identification is performed and an identification result is determined, and prompt the identification result through the prompting mode.

The second promoting module 307 is configured to determine a prompting mode at the time of determining a fingerprint image corresponding to the touch operation and performing the fingerprint identification, and when the fingerprint identification is performed and an identification result is determined, prompt the identification result through the prompting mode.

In the embodiments of the present disclosure, when a touch operation for fingerprint identification is detected on a display screen, an acting area and a touch position of the touch operation on the display screen may be determined. Afterwards, when the acting area is greater than or equal to a first preset area threshold and the touch position is located in a preset identification region on the display screen, a fingerprint image corresponding to the touch operation may be determined and the fingerprint identification may be performed. That is, the fingerprint identification is performed when parameters of the touch operation of the user meet certain conditions, which may improve accuracy of fingerprint identification. Besides, there is no need to determine the fingerprint image corresponding to the touch operation time and time again, thereby reducing power consumption of the terminal.

As for the above apparatus according to the embodiments, specific implementing manners of all the modules have been described in the embodiments of the related method, which will not be described repeatedly herein.

Figure 4:
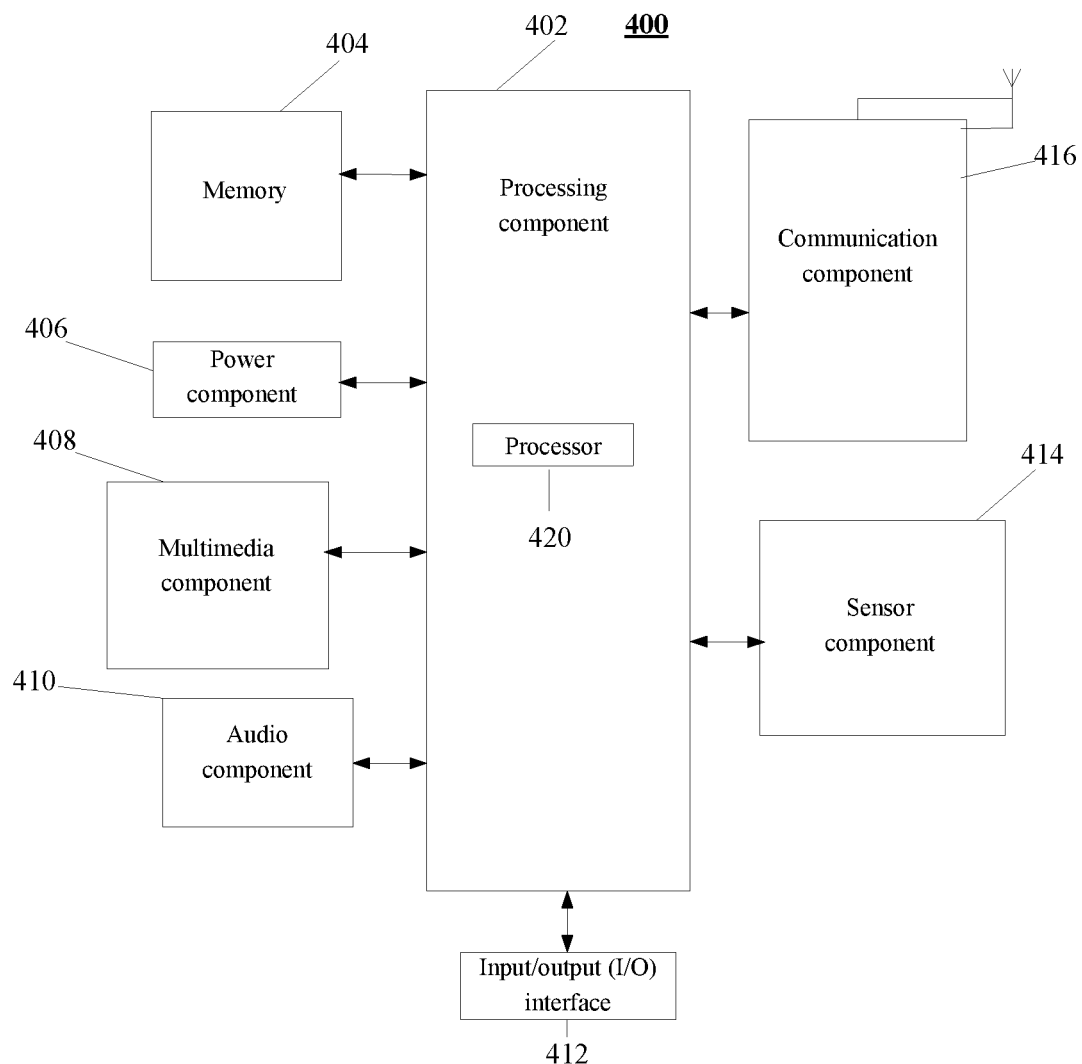
FIG. 4 is a block diagram of a fingerprint identification apparatus according to an aspect of the disclosure.

FIG. 4 is a block diagram of a fingerprint identification apparatus 400 provided by an embodiment of the present disclosure. For example, the apparatus 400 may be a mobile phone, a computer, a digital broadcast terminal, a messaging device, a gaming console, a tablet, a medical device, exercise equipment, a personal digital assistant, and the like.

Referring to FIG. 4, the apparatus 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the apparatus 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operations of the apparatus 400. Examples of such data include instructions for any applications or methods operated on the apparatus 400, contact data, phonebook data, messages, pictures, video, etc. The memory 404 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the apparatus 400. The power component 406 may include a power management system, one or more power sources, and any other components associated with the generation, management, and distribution of power in the apparatus 400.

The multimedia component 408 includes a screen providing an output interface between the apparatus 400 and the user. In embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In embodiments, the multimedia component 408 includes a front camera and/or a rear camera. The front camera and the rear camera may receive an external multimedia datum while the apparatus 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the apparatus 400 is in an operation mode, such as a call mode, a recording mode, and a voice recognition mode. The received audio signal may be further stored in the memory 404 or transmitted via the communication component 416. In embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide state assessments of various aspects of the apparatus 400. For instance, the sensor component 414 may detect an open/closed state of the apparatus 400, relative positioning of components, e.g., the display and the keypad, of the apparatus 400, a change in position of the apparatus 400 or a component of the apparatus 400, a presence or absence of user contact with the apparatus 400, an orientation or an acceleration/deceleration of the apparatus 400, and a change in temperature of the apparatus 400. The sensor component 414 may include a proximity sensor configured to detect the presence of nearby objects without any physical contact. The sensor component 414 may further include a light sensor, such as a CMOS or CCD image sensor, for use in imaging applications. In embodiments, the sensor component 414 may further include an accelerometer sensor, a gyroscope sensor, a magnetic sensor, a pressure sensor or a temperature sensor.

The communication component 416 is configured to facilitate communication, wired or wirelessly, between the apparatus 400 and other devices. The apparatus 400 may access a wireless network based on a communication standard, such as WiFi, 2G; or 3G or a combination thereof. In one exemplary embodiment, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is further provided a non-transitory computer-readable storage medium including instructions, such as included in the memory 404, executable by the processor 420 in the apparatus 400, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium are executed by a processor of a mobile terminal, the mobile terminal is enabled to perform a fingerprint identification method, including:

when a touch operation for fingerprint identification is detected on a display screen, determining an acting area and a touch position of the touch operation on the display screen; and determining a fingerprint image corresponding to the touch operation and performing the fingerprint identification, when the acting area is greater than or equal to a first preset area threshold and the touch position is located in a preset identification region on the display screen.

Alternatively or additionally, before determining the fingerprint image corresponding to the touch operation and performing the fingerprint identification, when the acting area is greater than or equal to a first preset area threshold and the touch position is located in a preset identification region, the method further includes:

determining an acting duration of the touch operation on the display screen; and correspondingly, the determining the fingerprint image corresponding to the touch operation and performing the fingerprint identification, when the acting area is greater than or equal to the first preset area threshold and the touch position is located in the preset identification region includes:

determining a fingerprint image corresponding to the touch operation and performing the fingerprint identification, when the acting area is greater than or equal to the first preset area threshold, the touch position is located in the preset identification region and the acting duration is longer than a preset duration.

Alternatively or additionally, the determining the acting area and the touch position of the touch operation on the display screen includes:

for each of a plurality of cross electrodes on the display screen, detecting a capacitance of the cross electrode when the touch operation is applied to the display screen;

determining a difference value between the capacitance of the cross electrode and a reference capacitance of the cross electrode when the touch operation is applied to the display screen, to obtain a capacitance difference value of the cross electrode;

when a capacitance difference value of at least one of the plurality of cross electrodes exceeds a first preset capacitance, determining a position of the at least one cross electrode on the display screen;

determining a region area surrounded by the position of the at least one cross electrode on the display screen as the acting area of the touch operation on the display screen; and determining a region position surrounded by the position of the at least one cross electrode on the display screen as the touch position of the touch operation.

Alternatively or additionally, the determining the touch position of the touch operation on the display screen includes:

determining a current generated by a first electrode, a current generated by a second electrode, a current generated by a third electrode, and a current generated by a fourth electrode, when the touch operation is applied to the display screen, the first electrode, the second electrode, the third electrode, and the fourth electrode being electrodes respectively provided at a first preset position, a second preset position, a third preset position, and a fourth preset position of a terminal where the display screen is located; and determining a touch position of the touch operation on the display screen based on a current generated by any three adjacent electrodes of the first electrode, the second electrode, the third electrode and the fourth electrode.

Alternatively or additionally, before determining the fingerprint image corresponding to the touch operation and performing the fingerprint identification, when the acting area is greater than or equal to a first preset area threshold and the touch position is located in a preset identification region on the display screen, the method further includes:

determining that the touch position is located in the preset identification region, when a center point of the touch position is within the preset identification region on the display screen; or determining that the touch position is located in the preset identification region on the display screen, when a distance between a center point of the touch position and a center point of the preset identification region is smaller than a preset distance.

Alternatively or additionally, the method further includes:

determining a prompting mode when the fingerprint identification is performed and an identification result is determined, and prompting the identification result through the prompting mode; or determining a prompting mode at the time of determining the fingerprint image corresponding to the touch operation and performing the fingerprint identification, and when the fingerprint identification is performed and an identification result is determined, prompting the identification result through the prompting mode.

In the embodiments of the present disclosure, when a touch operation for fingerprint identification is detected on a display screen, an acting area and a touch position of the touch operation on the display screen may be determined. Afterwards, when the acting area is greater than or equal to a first preset area threshold and the touch position is located in a preset identification region, a fingerprint image corresponding to the touch operation may be determined and the fingerprint identification may be performed. That is, the fingerprint identification is performed when parameters of the touch operation of the user meet certain conditions, which may improve accuracy of fingerprint identification. Besides, there is no need to determine the fingerprint image corresponding to the touch operation time and time again, thereby reducing power consumption of the terminal.

Other embodiments of the disclosure may be apparent to those skilled in the art from consideration of the specification and practice of the disclosure disclosed here. This application is intended to cover any variations, uses, or adoptions of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for fingerprint identification, comprising:
   when a touch operation for fingerprint identification is detected on a display screen, determining an acting area, a touch position, and a factor of generating the touch operation on the display screen, wherein the factor of generating the touch operation is determined according to the acting area and a first region area surrounded by a first group of cross electrodes in the touch position, wherein the factor of generating the touch operation is determined by using a variation tendency of the acting area and a center point distribution of the acting area caused by one touch process such that a preset factor of generating the touch operation is determined only when the display screen is touched by a finger, wherein an intensity of the finger gradually changes during the one touch process leading to a variation of the acting area, and a curvature of a prominence of the finger forms a specific center point distribution of the acting area, and wherein the factor of generating the touch operation is determined based on: a first factor where the display screen is touched by the finger, a second factor where the display screen is touched by the finger wearing a glove, and a third factor where the display screen is touched by an item;
   determining an acting duration of the touch operation on the display screen; and
   determining, when the acting area is greater than or equal to a first preset area threshold, when the touch position is located in a preset identification region on the display screen, and when the factor of generating the touch operation is the preset factor, a fingerprint image corresponding to the touch operation and performing the fingerprint identification by:
   determining a fingerprint image corresponding to the touch operation and performing the fingerprint identification, when the acting area is greater than or equal to the first preset area threshold, the touch position is located in the preset identification region, the factor of generating the touch operation is the preset factor, and the acting duration is longer than a preset duration.

2. The method according to claim 1, wherein the determining the acting area and the touch position of the touch operation on the display screen comprises:
   for each of a second group of cross electrodes on the display screen, detecting a capacitance of the cross electrode when the touch operation is applied to the display screen;
   when the touch operation is applied to the display screen, determining a difference value between the capacitance of the cross electrode and a reference capacitance of the cross electrode, to obtain a capacitance difference value of the cross electrode;
   when the capacitance difference value of at least one of the second group of cross electrodes exceeds a first preset capacitance, determining a position of the at least one cross electrode on the display screen;
   determining a second region area surrounded by the position of the at least one cross electrode on the display screen as the acting area of the touch operation on the display screen; and
   determining a region position surrounded by the position of the at least one cross electrode on the display screen as the touch position of the touch operation.

3. The method according to claim 1, wherein determining the touch position of the touch operation on the display screen comprises:
   determining a first current generated by a first electrode, a second current generated by a second electrode, a third current generated by a third electrode, and a fourth current generated by a fourth electrode, when the touch operation is applied to the display screen, the first electrode, the second electrode, the third electrode, and the fourth electrode being electrodes respectively provided at a first preset position, a second preset position, a third preset position, and a fourth preset position of a terminal where the display screen is located; and determining the touch position of the touch operation on the display screen based on the currents generated by any three adjacent electrodes among the first electrode, the second electrode, the third electrode and the fourth electrode.

4. The method according to claim 1, wherein before determining the fingerprint image corresponding to the touch operation and performing the fingerprint identification, when the acting area is greater than or equal to the first preset area threshold, the touch position is located in the preset identification region, and the factor of generating the touch operation is the preset factor, the method further comprises:

when a center point of the touch position is within the preset identification region, determining that the touch position is located in the preset identification region.

5. The method according to claim 4, wherein before determining the fingerprint image corresponding to the touch operation and performing the fingerprint identification, when the acting area is greater than or equal to the first preset area threshold, the touch position is located in the preset identification region, and the factor of generating the touch operation is the preset factor, the method further comprises:

when a distance between a center point of the touch position and a center point of the preset identification region is smaller than a preset distance, determining that the touch position is located in the preset identification region.

6. The method according to claim 1, further comprising: determining that the touch position is located in the preset identification region, when a center point of the touch position is within the preset identification region; and determining that the touch position is located in the preset identification region, when a distance between a center point of the touch position and a center point of the preset identification region is smaller than a preset distance.

7. The method according to claim 1, further comprising: determining a prompting mode at the time of determining the fingerprint image corresponding to the touch operation and performing the fingerprint identification; and when the fingerprint identification is performed and an identification result is determined, prompting the identification result through the prompting mode.

8. The method according to claim 1, wherein determining whether the factor of generating the touch operation is the preset factor includes:

ordering a plurality of acting areas detected periodically within a designated time period according to detecting time; and in response to determining that the plurality of acting areas after being ordered increase successively and the first region area is smaller than a second preset area threshold, determining that the factor of generating the touch operation is the preset factor, wherein the second preset area threshold is smaller than the first preset area threshold.

9. A fingerprint identification apparatus, comprising:
a processor; and
a memory for storing instructions executable by the processor,
wherein the processor is configured to perform:
when a touch operation for fingerprint identification is detected on a display screen, determining an acting area, a touch position, and a factor of generating the touch operation on the display screen, wherein the factor of generating the touch operation is determined according to the acting area and a first region area surrounded by a first group of cross electrodes in the touch position, wherein the factor of generating the touch operation is determined by using a variation tendency of the acting area and a center point distribution of the acting area caused by one touch process such that a preset factor of generating the touch operation is determined only when the display screen is touched by a finger, wherein an intensity of the finger gradually changes during the one touch process leading to a variation of the acting area, and a curvature of a prominence of the finger forms a specific center point distribution of the acting area, and wherein the factor of generating the touch operation is determined based on:
a first factor where the display screen is touched by the finger, a second factor where the display screen is touched by the finger wearing a glove, and a third factor where the display screen is touched by an item;

determining an acting duration of the touch operation on the display screen; and when the acting area is greater than or equal to a first preset area threshold, when the touch position is located in a preset identification region on the display screen, and when the factor of generating the touch operation is the preset factor, determining a fingerprint image corresponding to the touch operation and performing the fingerprint identification by:

determining a fingerprint image corresponding to the touch operation and performing the fingerprint identification, when the acting area is greater than or equal to the first preset area threshold, the touch position is located in the preset identification region, the factor of generating the touch operation is the preset factor, and the acting duration is longer than a preset duration.

10. The apparatus according to claim 9, wherein the processor is further configured to:

for each of a second group of cross electrodes on the display screen, detect a capacitance of the cross electrode when the touch operation is applied to the display screen;

when the touch operation is applied to the display screen, determine a difference value between the capacitance of the cross electrode and a reference capacitance of the cross electrode, to obtain a capacitance difference value of the cross electrode;

when a capacitance difference value of at least one of the second group of cross electrodes exceeds a first preset capacitance, determine a position of the at least one cross electrode on the display screen;

determine a second region area surrounded by the position of the at least one cross electrode on the display screen as the acting area of the touch operation on the display screen; and determine a region position surrounded by the position of the at least one cross electrode on the display screen as the touch position of the touch operation.

11. The apparatus according to claim 10, wherein the processor is further configured to:

determine that the touch position is located in the preset identification region, when a center point of the touch position is within the preset identification region; and determine that the touch position is located in the preset identification region, when a distance between a center point of the touch position and a center point of the preset identification region is smaller than a preset distance.

12. The apparatus according to claim 9, wherein the processor is further configured to:
   determine a current generated by a first electrode, a current generated by a second electrode, a current generated by a third electrode, and a current generated by a fourth electrode, when the touch operation is applied to the display screen, the first electrode, the second electrode, the third electrode, and the fourth electrode being electrodes respectively provided at a first preset position, a second preset position, a third preset position, and a fourth preset position of a terminal where the display screen is located; and
   determine the touch position of the touch operation on the display screen based on the current generated by any three adjacent electrodes among the first electrode, the second electrode, the third electrode and the fourth electrode.

13. The apparatus according to claim 9, wherein the processor is further configured to:
   determine that the touch position is located in the preset identification region, when a center point of the touch position is within the preset identification region.

14. The apparatus according to claim 9, wherein the processor is further configured to:
   determine that the touch position is located in the preset identification region, when a distance between a center point of the touch position and a center point of the preset identification region is smaller than a preset distance.

15. The apparatus according to claim 9, wherein the processor is further configured to:
   determine a prompting mode when the fingerprint identification is performed and an identification result is determined, and prompt the identification result through the prompting mode.

16. The apparatus according to claim 9, wherein the processor is further configured to:
   determine a prompting mode at the time of determining the fingerprint image corresponding to the touch operation and performing the fingerprint identification; and
   when the fingerprint identification is performed and an identification result is determined, prompt the identification result through the prompting mode.

17. A non-transitory readable storage medium comprising instructions, executable by a processor in a terminal, for performing acts comprising:
   when a touch operation for fingerprint identification is detected on a display screen, determining an acting area, a touch position, and a factor of generating the touch operation on the display screen, wherein the factor of generating the touch operation is determined according to the acting area and a region area surrounded by a group of cross electrodes in the touch position, wherein the factor of generating the touch operation is determined by using a variation tendency of the acting area and a center point distribution of the acting area caused by one touch process such that a preset factor of generating the touch operation is determined only when the display screen is touched by a finger, wherein an intensity of the finger gradually changes during the one touch process leading to a variation of the acting area, and a curvature of a prominence of the finger forms a specific center point distribution of the acting area, and wherein the factor of generating the touch operation is determined based on: a first factor where the display screen is touched by the finger, a second factor where the display screen is touched by the finger wearing a glove, and a third factor where the display screen is touched by an item;
   determining an acting duration of the touch operation on the display screen; and
   determining, when the acting area is greater than or equal to a first preset area threshold, when the touch position is located in a preset identification region on the display screen, and when the factor of generating the touch operation is the preset factor, a fingerprint image corresponding to the touch operation and performing the fingerprint identification by:
   determining a fingerprint image corresponding to the touch operation and performing the fingerprint identification, when the acting area is greater than or equal to the first preset area threshold, when the touch position is located in the preset identification region, when the factor of generating the touch operation is the preset factor, and when the acting duration is longer than a preset duration.

* * * * *